US 011479197 B2

(12) United States Patent
Grasi et al.

(10) Patent No.: US 11,479,197 B2
(45) Date of Patent: Oct. 25, 2022

(54) METHOD AND CONTROL UNIT TO CHARGE A PERSONAL-PROTECTION-DEVICE ENERGY STORE FOR OPERATING A PERSONAL-PROTECTION-DEVICE OF A VEHICLE

(71) Applicant: Robert Bosch GmbH, Stuttgart (DE)

(72) Inventors: Florian Grasi, Heilbronn (DE); Hartmut Schumacher, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 233 days.

(21) Appl. No.: 16/753,224

(22) PCT Filed: Oct. 4, 2018

(86) PCT No.: PCT/EP2018/076969
§ 371 (c)(1),
(2) Date: Apr. 2, 2020

(87) PCT Pub. No.: WO2019/076637
PCT Pub. Date: Apr. 25, 2019

(65) Prior Publication Data
US 2020/0324722 A1    Oct. 15, 2020

(30) Foreign Application Priority Data

Oct. 18, 2017   (DE) .......................... 102017218564.3

(51) Int. Cl.
*H02J 7/00*  (2006.01)
*B60R 21/017*  (2006.01)
(Continued)

(52) U.S. Cl.
CPC ............ *B60R 21/017* (2013.01); *B60R 16/03* (2013.01); *H02J 7/00041* (2020.01);
(Continued)

(58) Field of Classification Search
CPC .... B60R 21/017; B60R 16/03; H02J 7/00712; H02J 7/00041; H02J 7/007; H02J 7/007182; H02J 7/04
(Continued)

(56) References Cited

U.S. PATENT DOCUMENTS 5,952,815 A      9/1999  Rouillard et al.
2007/0278994 A1* 12/2007 Mayega ............... H02J 7/00711
                                                          320/107
(Continued)

FOREIGN PATENT DOCUMENTS

DE    102012210931 A1    1/2014
DE    102014207171 A1   10/2015
(Continued)

OTHER PUBLICATIONS

International Search Report for PCT/EP2018/076969, dated Feb. 18, 2019.

*Primary Examiner* — Zixuan Zhou
(74) *Attorney, Agent, or Firm* — Norton Rose Fulbright US LLP; Gerard Messina

(57) ABSTRACT

A method to charge a personal-protection-device energy store for operating a personal protection device of a vehicle. The method includes a step of reading in a voltage value of a source energy store of the vehicle. In addition, the method includes a step of ascertaining a charging current for charging the personal-protection-device energy store with power from the source energy store, the charging current being ascertained, using the voltage value read in; and using the charging current for charging the personal-protection-device energy store.

14 Claims, 3 Drawing Sheets

(51) Int. Cl.
  *B60R 16/03* (2006.01)
  *H02J 7/04* (2006.01)
(52) U.S. Cl.
  CPC .......... *H02J 7/00712* (2020.01); *H02J 7/007* (2013.01); *H02J 7/007182* (2020.01); *H02J 7/04* (2013.01)
(58) Field of Classification Search
  USPC ............................................ 320/109; 701/22
  See application file for complete search history.

(56) References Cited

U.S. PATENT DOCUMENTS

| | | | | |
|---|---|---|---|---|
| 2009/0212544 | A1* | 8/2009 | Schumacher | H02J 9/061 280/735 |
| 2011/0012568 | A1 | 1/2011 | Schumacher | |
| 2013/0038297 | A1* | 2/2013 | Sang | H02J 7/0071 320/145 |
| 2015/0361942 | A1* | 12/2015 | List | F02P 3/09 324/382 |

FOREIGN PATENT DOCUMENTS

| | | |
|---|---|---|
| EP | 0577988 A1 | 1/1994 |
| JP | 2013526258 A | 6/2013 |
| WO | 2007003469 A2 | 1/2007 |
| WO | 2016096213 A1 | 6/2016 |

\* cited by examiner

METHOD AND CONTROL UNIT TO CHARGE A PERSONAL-PROTECTION-DEVICE ENERGY STORE FOR OPERATING A PERSONAL-PROTECTION-DEVICE OF A VEHICLE

FIELD

The present invention relates to a method and a control unit to charge a personal-protection-device energy store. The present invention also related to a computer program.

BACKGROUND INFORMATION

As an example of personal protection devices in vehicles, airbag systems store the energy necessary for activating restraining devices in power reserves or energy stores. In the same way, energy for maintaining the airbag system functionality in the case of power supply interruption due to the effects of a crash is held in reserve and stored in advance in a personal-protection-device energy store.

SUMMARY

In accordance with the present invention, a method, a control unit which utilizes this method, and a corresponding computer program are provided. Advantageous refinements and improvements of the method, the device, and the control unit according to the present invention are described herein.

The present invention provides an example method to charge a personal-protection-device energy store for operating a personal protection device of a vehicle. The example method includes the following steps:
  reading in a voltage value of a source energy store of the vehicle; and
  ascertaining a charging current for charging the personal-protection-device energy store with power from the source energy store, the ascertaining of the charging current taking place, using the voltage value read in; and/or ascertaining a supply current of a control unit or its change by selecting the charging current of the personal-protection-device energy store; and using the charging current to charge the personal-protection-device energy store.

In this case, a vehicle may be understood as a motor vehicle, such as a passenger car, a cargo truck, a bus, or the like. Presently, a personal-protection-device energy store may be understood as an energy store, which is provided directly for supplying a personal protection device, for example, an airbag, a belt tensioner, a roll bar, or the like, with power, in particular, electrical power. In this connection, the personal-protection-device energy store may be charged with power from a source energy store, and in the case of a collision of the vehicle and/or a failure of voltage supply by the electrical system of the vehicle, it may supply the personal protection device (for example, autonomously) with (electrical) power. A source energy store may be understood as, for example, a main energy store of the vehicle, in particular, a vehicle battery, or a vehicle battery buffered by a generator.

In accordance with the present invention, the personal protection device may be brought into an operational state highly rapidly, when a charging current for charging the personal-protection-device energy store is ascertained and/or adjusted as a function of a (current) voltage value of the source energy store. Through this, one may utilize the fact that the voltage value of the source energy store provides an inference about the current loading of the source energy store and/or the state of charge of this source energy store, which means that the personal-protection-device energy store may be charged with a higher or lower charging current as a function of the instantaneous loading and/or state of charge of this source energy store. Likewise, the losses in the step-up transformer of the airbag control unit are a function of the supply current. By knowledge of the supply voltage, the increasing power output of the step-up transformer in response to increasing voltage of the source energy store may be used, in order to raise the charging current of the personal protection device store without overloading the step-up transformer. This results in the personal-protection-device energy store's no longer having to be charged with a predefined charging current, which is already set in the factory and would have to be selected to be so low, that in the case of a high loading and also a lower state of charge of the source energy store, the personal-protection-device energy store may still be charged within the desired initial operation time. On the contrary, by considering the voltage value of the source energy store during the ascertainment of the charging current for charging the personal-protection-device energy store, the instantaneous, actual loading and/or the state of charge of the source energy store/of the step-up transformer is now taken into account, so that in comparison with the conventional procedure, the charging current may now be increased markedly, which results in a significant reduction of the period of time, which is necessary for putting the personal protection device into operation (for example, after the vehicle is started).

An advantage of specific embodiments of the present invention include, in particular, using the higher efficiency of a boost converter with increasing vehicle voltage to adaptively program the charging-current controller for charging the personal-protection-device energy store in the form of a power reserve, and therefore, attaining markedly more rapid charging times, as well as taking into account load demands of the source energy store.

What is favorable, is a specific embodiment of the present invention, in which during a charging operation of the personal-protection-device energy store, the steps of reading-in and of ascertaining are executed so as to be repeated at least once, in particular, repeated cyclically. Such a specific embodiment provides the advantage of being able to take into account, in real time, the instantaneous loading situation of the source energy store, for example, the (main) vehicle battery, and of the step-up transformer; the instantaneous loading situation of the source energy store being able to change highly rapidly, in particular, in response to the starting of the vehicle and the initial operation of a plurality of vehicle systems caused by this.

A specific embodiment of the present invention, in which the steps of reading-in and ascertaining are executed so as to be repeated after a time interval of 0.5 ms to 10 ms, is particularly advantageous. The execution of the reading-in and ascertaining steps in a time frame developed in such a manner represents an optimum solution, in order to be able to respond, on one hand, to changes in the loading situation of the source energy store and of the step-up transformer in real time, and, on the other hand, to cause unnecessary numerical and/or circuitry loading due to the execution of the steps of the method provided herein.

According to a further specific embodiment of the present invention, the charging current may be ascertained in the ascertaining step, using a look-up table. A relationship between the voltage value of the source energy store and the charging current of the personal-protection-device energy store, in view of a power demand of one or more electronic components of the vehicle, of a system of the vehicle, and/or of the control unit of the personal protection device, may be stored in this look-up table. Using a look-up table determined in advance, such a specific embodiment provides the advantage of minimizing a required computing expenditure for ascertaining the charging current.

In order to cause as little a reaction, disturbance and/or impairment as possible of further components of the vehicle, due to the charging of the personal-protection-device energy store, according to a further specific embodiment, the charging current may be ascertained in the ascertaining step, with knowledge of a current power demand of at least one electronic component of the vehicle. In this connection, this knowledge may also have been used in advance, in order to determine a relationship between the voltage value of the source energy store and the charging current in a look-up table.

A current voltage value of the source energy store may be obtained highly rapidly and in real time, if, in the reading-in step, the voltage value is read in by a voltage divider; in particular, a value read in by the voltage divider being converted from analog to digital.

In order to prevent unnecessary flow of current in the voltage divider, which is particularly relevant to continuously powered SLEEP systems, the voltage divider may optionally be equipped with a transistor positioned in series (high or low side). This interrupts the flow of current in the voltage divider in the rest state (SLEEP).

According to a further specific embodiment of the present invention, the method may include a step of charging the personal-protection-device energy store, using the ascertained charging current; in particular, a programmable, current-controlled transistor being used in the charging step for setting the charging current. Such a specific embodiment of the approach put forward here provides the advantage of a particularly rapid and/or precise adjustment of the charging current for charging the personal-protection-device energy store and, therefore, for implementing the advantages of the approach put forward here.

In addition, a specific embodiment of the present invention, in which the reading-in and ascertaining steps are executed and/or controlled, using a digital processor, is advantageous. Such a specific embodiment provides the advantage of performing the steps of the approach put forward here, using sensible filtering for incrementally adjusting the loading of the source energy store and of the step-up transformer; as well as allowing a rapid reduction in the loading (different filtering times in the direction of load increase and load reduction); in order to cause, on one hand, as low a loading of the source energy store/step-up transformer as possible and, on the other hand, to effect rapid charging of the personal-protection-device energy store.

The specific embodiments of the method according to the present invention may be implemented, for example, as software or hardware or as a mixture of software and hardware, in, for example, a control unit.

The present invention also provides an example control unit, which is configured to perform, control and/or implement, in corresponding devices, the steps of a variant of a method described herein. An object of the present invention may be achieved quickly and efficiently by this embodiment variant of the present invention in the form of a control unit, as well.

To this end, the control unit may include at least one processing unit for processing signals or data, at least one storage unit for storing signals or data, at least one interface to a sensor or to an actuator for reading in sensor signals from the sensor or for outputting control signals to the actuator, and/or at least one communications interface for reading in or outputting data, which are embedded in a communications protocol. The processing unit may be, for example, a signal processor, a microcontroller or the like; the storage unit being able to be a flash memory, an EEPROM or a magnetic storage unit. The communications interface may be configured to read in or output data wirelessly and/or by wire; a communications interface, which is able to read in or output the data transmitted by wire, being able to read in these data, e.g., electrically or optically, from a corresponding data transmission line or to output them to a corresponding data transmission line.

In the case at hand, a control unit may be understood to be an electrical device, which processes sensor signals and outputs control and/or data signals as a function of them. The control unit may have an interface, which may be implemented as hardware and/or software. In a hardware design, the interfaces may be, for example, part of a so-called system ASIC that contains various functions of the control unit. However, it is also possible for the interfaces to be separate, integrated circuits or to be at least partially made up of discrete components. In a software design, the interfaces may be software modules that are present, for example, in a microcontroller, next to other software modules.

In one advantageous refinement of the present invention, a personal protection device, such as an airbag of a vehicle, is controlled by the control unit. To this end, for example, the control unit may access sensor signals, such as a voltage value signal, which represents a voltage of the vehicle battery in the form of a source energy store. The control is accomplished via actuators, such as a transistor-based, adjustable (programmable) current controller for charging the personal-protection-device energy store, using a charging-current signal that represents the ascertained charging current.

A computer program product or computer program including program code, which may be stored in a machine-readable carrier or storage medium, such as a solid state memory, a hard disk storage device or an optical storage device and is used for performing, implementing and/or controlling the steps of the method according to one of the above-described specific embodiments, in particular, when the program product or program is executed on a computer or a device, is also advantageous according to the present invention.

Exemplary embodiments of the present invention are represented in the figures and explained in greater detail below.

DETAILED DESCRIPTION OF EXAMPLE EMBODIMENTS

Figure 1:
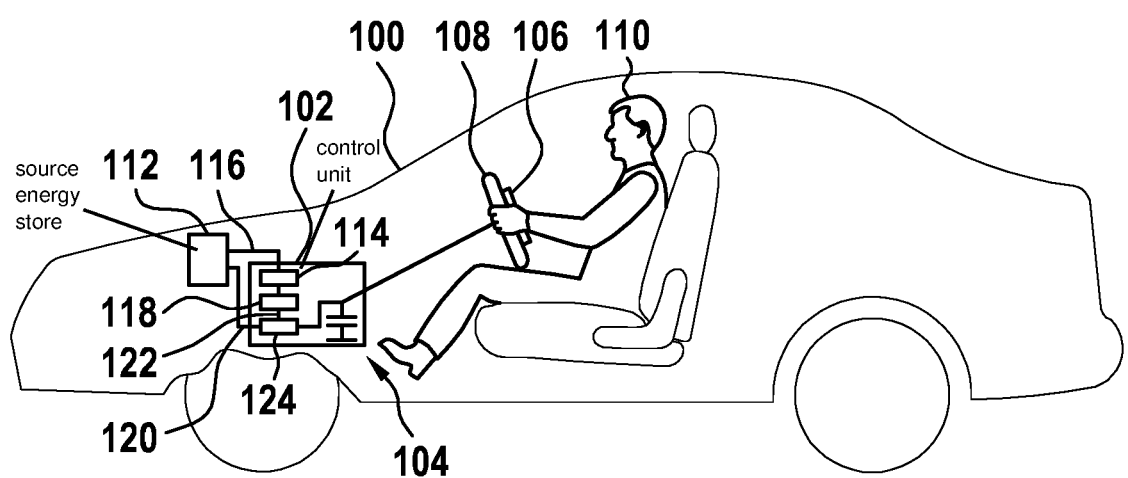
FIG. 1 shows a block diagram of a device according to one exemplary embodiment.

In the following description of preferred exemplary embodiments of the present invention, the same or similar reference numerals are used for the elements that are shown in the different figures and function similarly, in which case a repeated description of these elements is omitted.

FIG. 1 shows a schematic representation of a vehicle 100, including a block diagram of a control unit 102 to charge a personal-protection-device energy store 104 of a personal protection device for operating a personal protection device 106 of vehicle 100. Personal protection device 106 may be, for example, an airbag, which deploys from steering wheel 108 in the case of a collision of vehicle 100 with an object not shown in FIG. 1, in order to protect a vehicle occupant 110. In addition to the airbag in steering wheel 108, there are a number of further airbags in a vehicle 100, which are to be powered by electrical energy, as well, as may be supplied from energy store 104 of the personal protection device. Personal-protection-device energy store 104 may be, for example, a capacitor, which, in response to the initial operation of vehicle 100, may be charged with electrical energy from a source energy store 112, for example, a main vehicle battery. In order to execute the charging of personal-protection-device energy store 104 as rapidly and efficiently as possible in accordance with the approach proposed here, control unit 102 may read in a voltage value 116 of source energy store 112 via an interface 114; the voltage value representing, for example, a current voltage of this source energy store 112, that is, of the (main) vehicle battery. In response to the voltage value read in, a supply current (max. input power) 120-1, from which a personal-protection-device energy store 104 is intended to be charged with (electrical) energy from source energy store 112, may be ascertained in a unit 118 of control unit 102. Using input variable 116, (120-1) in an algorithm and/or look-up table, a suitable setting (programming) 122 including corresponding filtering (e.g., temporally staggered correction) may be generated in unit 118. Using setting signal 122, charging-current controller 124 generates optimum charging current (120) for the personal-protection-device energy store. For example, in order to charge a programmable current, this unit 124 may include a controlled transistor 124_1, which is controlled (programmed), using current signal 122_1.

The approach put forward here, that is, the present invention, has an object of representing the requirements of automobile manufacturers in a cost-effective manner for implementing airbag system initializing phases of less than or equal to 4 s, and of limiting the repercussions on the source energy store. The charging of the power reserve, which is formed, in this case, by personal-protection-device energy store 104, belongs to the initialization phase after power on/or wake up as fundamentally time-determinant. If possible, this charging time should be able to be reduced without increasing the costs of the power supply system.

To store energy, in particular, for activating restraining devices, airbag systems use aluminum electrolyte capacitors, which presently form the personal-protection-device energy store 104 that is also denoted by reference character ER. These capacitors are optimum with regard to cost, energy density, low internal resistance, temperature stability, and service life. In particular, aluminum electrolyte capacitors having a nominal voltage Un of 18 V to 50 V are used (standard values include Un=25 V/35 V).

Figure 2:
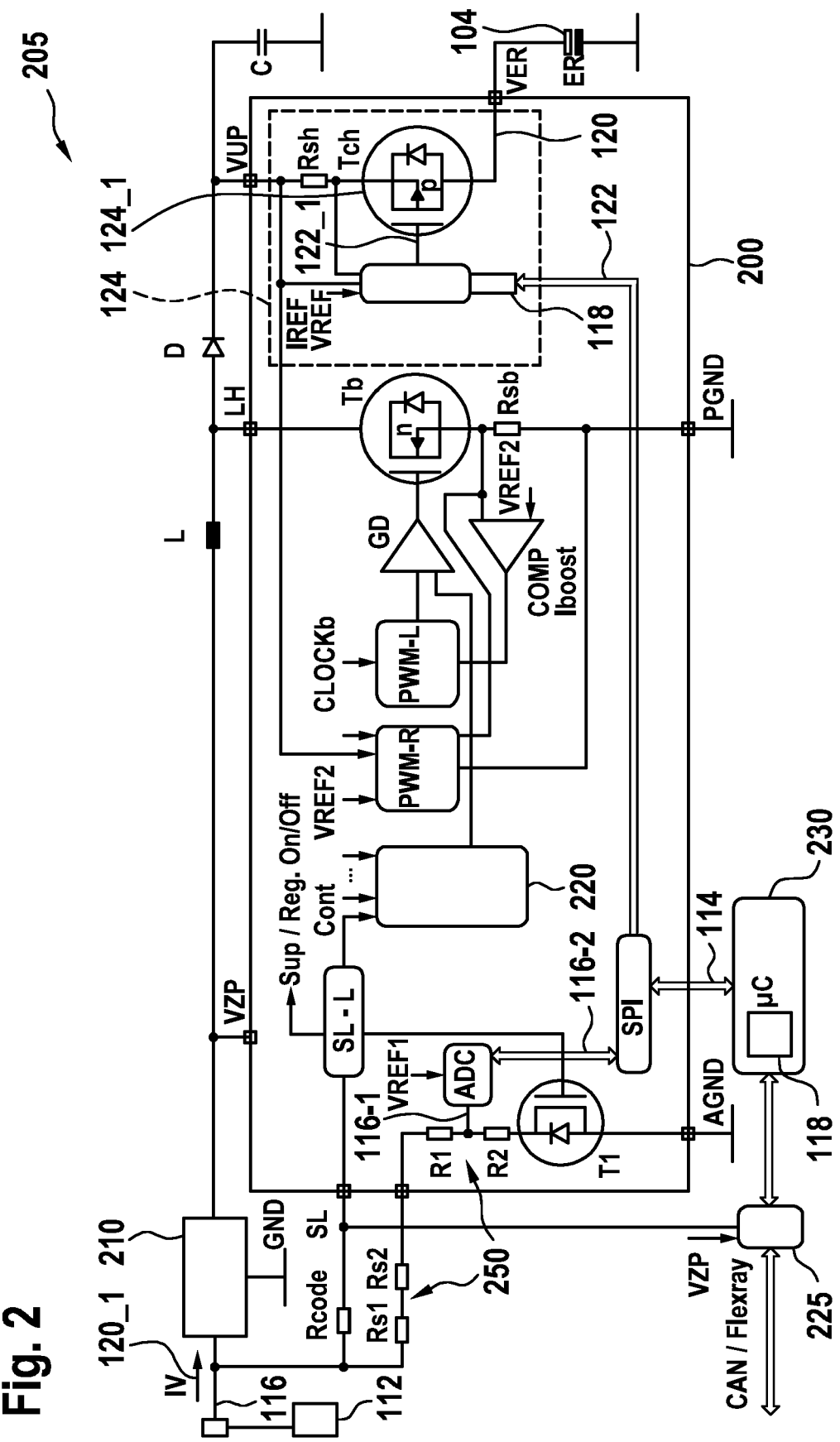
FIG. 2 shows a schematic circuit diagram of an exemplary embodiment of the present invention, in the form of a control unit.

FIG. 2 shows a block diagram of a relevant part 200 of the SBC system basic chip (SBC=system basis chip), in which a boost converter 205 is shown. From UB (UB=the current battery voltage, corresponding to voltage value 116, of the vehicle battery in the form of source energy store 112), it generates the reverse-polarity-protected battery voltage VZP (approximately UB−1 V) filtered by filter unit 210. This voltage is used initially to supply power to SBC 200 itself, and is fed to coil inductor L of boost converter (step-up transformer) 205.

This boost converter 205 includes a current-limited, n-channel, switching transistor Tb. The current-limiting of Tb is produced across comparator COMP Iboost.

If the current through boost transistor Tb and shunt Rsb (having a resistance value RSB) increases to Iboost_lim, then comparator COMP Iboost flips (flip threshold VREF3=Iboost_lim*RSB) and switches off Tb via PWM logic circuit PWM-L and gate driver GD.

The freewheeling of boost converter 205 occurs via diode D, to whose cathode VUP control capacitor C is connected. The VUP voltage is supplied to the SBC for voltage regulation (PWM controller PWM-R). A comparison with a reference voltage VREF2 takes place here in such a manner, that VUP=M×VREF2, where M constitutes a factor (e.g., VREF2=1.24 V; M=26.613, VUP=33 V).

For the clocked operation of the boost converter, PWM logic circuit PWM-L is supplied a switching converter frequency (for example, Clockb=2.2 MHz).

The duty cycle of the switching converter frequency is adjusted in a suitable manner by PWM controller PWM-R as a function of the measured, instantaneous converter current (measured across Rsb), with the aid of an operational amplifier in PWM controller PWM-R, and/or by knowledge of the current VZP voltage.

Enabling logic circuit 220 controls the converter operation as a function of various signals. For example, switching-on or switching-off is brought about by enabling logic circuit 220, if the VZP voltage is too low (VZPmin=5V), the temperature is too high, the VUP voltage is too high, or rest mode SLEEP is active/not active. The rest mode, also called SLEEP function, in an airbag system, is mainly controlled by suitable sleep transceivers 225 and microcontroller μC. In response to bus activity, the transceiver changes the state of its SLEEP pins SL, that is, current is generated, and the potential is increased to approximately the voltage level VZP, as a consequence of which SBC 200 operates. In order to switch off all loads at UB, all of the loads are controlled via sleep logic circuit SL-L so as to be switched to ground (e.g., T1). In the case of the activated rest mode (that is, in the SLEEP case), the components of SBC 200 are switched off, in order that its power requirement from VZP is brought down to under 30 μA.

If it is a standard airbag application, SLEEP input SL of SBC 200 is connected directly to UB (that is, to the line leading to main vehicle battery) via the Rcode, to the "high" signal level, which means that SBC 200 starts with the switching-on of supply voltage UB.

Using boost converter 205 (that is, a step-up converter, step-up transformer), the vehicle voltage may be increased from 6 V . . . 16.5 V to 25 V . . . 45 V. A programmable charging-current controller 124, which charges personal-protection-device energy store 104 in the form of power reserve Elko, in particular, in the initialization phase after power-on or wake-up, in response to the starting of vehicle 100, is connected to the output of converter 205. The level of charging current is selected via interface 122, using programming. Unit 118 supplies the programming values, e.g., via a serial interface (SPI). In this connection, according to the following description, this charging-current controller 124 may be used as unit 124, which selects the controlled variable for current-regulating transistor 124_1; the controlled variable determining the charging current for personal-protection-device energy store 104 (or ER). Furthermore, additional loads, such as buck converters (step-down converters), may be connected to the output of boost converter 205, in order to provide the necessary system voltages (e.g., VAS=6.7 V) for the external sensors in accordance with the PSI standard. Boost converter 205 is intended to be designed in such a manner, that even in rare voltage situations down to 6 V, caused by weak/defective vehicle batteries 112, it allows the supply of power to control unit 102 and the charging of the power reserve in the form of personal-protection-device energy store 104; in this battery state, it being usually no longer possible to start vehicle 100.

An advantage of exemplary embodiments of the present invention described here, in particular, using the higher efficiency of boost converter 205 with increasing vehicle voltage to adaptively program charging-current controller 124 for charging personal-protection-device energy store 104 in the form of power reserve ER, and therefore, attaining markedly more rapid charging times for, e.g., more than 98% of all power-on/wake-up phases, as well as taking into account load demands of the source energy store.

In design and costs, a given boost converter 205 of an airbag control unit is essentially defined by input power Pin and efficiency (Pout/Pin) at a minimum input voltage, e.g., 5 V. As a rule, an additional voltage drop of approximately 1 V between the UB terminal of the control unit and the converter input should be assumed. This is caused by the unit 210 for ensuring the reverse polarity protection, and by filtering measures against interference of the vehicle electrical system and boost converter.

The minimum input power available (Pin-min) is given by the current-limiting of boost converter 205, the minimum permissible input voltage Uboost_min, at which boost converter 205 is still active, and the minimum duty cycle of boost converter 205.

For example, at a 2.2 MHz switching frequency (=cycle time of 455 ns), a fixed-frequency boost converter in the form of boost converter 205 has a minimum value of current limitation (Iboost_min) of switching transistor Tb (shunt transistor) of 2 A and a minimum duty cycle Dboost_min=charging phase/cycle time=410 ns/455 ns=0.9. From this, the following is obtained for minimum input power Pin_min of boost converter 205:

$$Pin\_min = Uboost\_min * Iboost\_min * Dboost\_min$$
(e.g., =(5 V*2 A*0.9)=9 W)

A minimum efficiency of the boost converter ηboost_min of 70% yields a minimum available output power of boost converter 205 of $$Pout\_min = Pin\_min * \eta boost\_min \text{ (e.g., } =9 W*0.7=6.3 W)$$

If regulated output voltage Vup of boost converter 205 is, for example, 33 V, then in the worst case, boost converter 205 may supply the minimum output current Iup_min=Pout_min/VUP (e.g., 6.3 W/33 V=191 mA). Thus, on the whole, the following is obtained $$Iup\_min = [Uboost\_min * Iboost\_min * Dboost\_min * \eta boost\_min] / VUP$$

If the design of the airbag control unit allows for essentially two loads at voltage terminal VUP, then the following is to be selected: Iup_min=IV1max+IV2max, in order to ensure the functioning of the airbag control unit, even in the case of unfavorable input voltages up to a voltage value of UB=6 V.

If n loads are provided, then: Iup_min=IV1max+IV2max+ . . . +IVnmax

If IV1max is the load current, which is available to charging controller 124 of power reserve ER in the worst case, then, in previous airbag systems, the current of charging-current controller 124/124_1 is programmed by system microcontroller μC via a communications interface to the microchip, which contains charging-current controller 124 (as a rule, the system basis chip), in such a manner, that the following is true for charging current 120, that is, Icharge_prog:

$$Icharge\_prog \leq IV1 \text{ max}.$$

If, for example, Iup_min=191 mA, and if two loads are connected to the VUP terminal (in this case, for example, the charging-current controller (IV1) and a buck converter (IV2)), then the current value IV1_max=Iup_min−IV2_max is available to charging-current controller 124/124_1.

If IV2_max=111 mA, then charging-current controller 124/124_1 may be programmed to IV1_max greater than or equal to 80 mA, without boost voltage Vup suddenly dropping.

Consequently, a maximum power reserve capacitance of 10 mF may be charged in 4.125 s. Since in addition to the important period of time of charging the power reserve ER for the personal protection device, that is, personal-protection-device energy store 104, the initialization phase of an airbag system includes other time-consuming tasks (for example, a test of the RESET, μC INIT, NVM init; CAN/Flex Ray Init/seatbelt/sitting position/passenger airbag On/Off status determination; test safety path . . . ), which may be estimated at approximately 1 to 2 s, charging times of power reserve ER, that is, of personal-protection-device energy store 104, of under 3 s are to be attained, in order to allow an initialization after power on/wake up (=readiness for a crash evaluation), demanded by the vehicle manufacturers, within a time window of 4 s.

Now, in order to charge personal-protection-device energy store 104, that is, power reserve ER, as rapidly as possible, a control unit 102 according to an exemplary embodiment of the present invention is provided. According to one exemplary embodiment, such a control unit 102 includes a power-reserve charging-current controller 124/124_1, which, as described above, contains an interface 122 for reading in the suitable charging-current programming value (ascertained in the unit 118 for complying with charging-rate demands of power reserve 104, load limits of source energy store 112 and load limits of boost converter 205). A unit 118 for ascertaining and providing the necessary programming data. To this end, voltage 116 is fed through measuring circuit 116_1/116_2 (voltage divider, ADC) to the μC, μP having unit 118, via an interface (SPI). In addition to a suitable algorithm and/or use of scalable look-up tables (116 →charging current) (using source parameters and/or boost converter parameters), this unit contains to ascertain the SPI data 114 for programming charging-current controller 124 via interface 122. In addition to the analog-to-digital controller unit, charging-current controller 124 includes regulating transistor Tch (P-channel MOSFET) with current measurement across shunt Rsh.

By comparison with a programmable reference voltage 122 or reference current, power-reserve charging current 120 is adjusted, with the aid of (gate signal) current signal 122_1, to the value specified by programming and/or calculation, by appropriately controlling transistor Tch.

In the same way, the charging-current controller may be switched on by the μC, μP via the communications interface SPI to charging-current controller interface 122.

In addition, the temporal adjustment of the charging-current controller programming takes place in accordance with a suitable filtering strategy (e.g., slowly, in small current adjustment steps, increasing and rapid, with large current adjustment steps, decreasing).

Alternatively, the ascertaining of the charging current may take place by moving unit 118 into SBC 200.

Across the voltage divider 250 having resistors Rs1, Rs2, R1, R2, for example, current supply voltage 116 (whose value is designated by the label UB) of source energy store 112 (for example, of the main vehicle battery) is measured in the form of a divided voltage value 116_1 and digitized by an analog-to-digital converter ADC integrated in the SBC. In this connection, voltage VREF1 is used as a reference voltage for analog-to-digital converter ADC. According to one exemplary embodiment, using SPI communications interface SPI, microcontroller μC requests the current voltage values every 0.5 ms . . . 10 ms for the purpose of adaptively charging power reserve ER, that is, personal-protection-device energy store 104.

For example, for reasons of robustness, voltage divider 250 includes the redundantly constructed, protective resistors Rs1, Rs2 for measuring battery voltage 116 and supplying voltage value UB. These also limit the current in the case of negative voltage values of source energy store 112, that is, of the main vehicle battery, in particular, if, at input Ubm, SBC 200 has an ESD diode to ground (anode at ground). For example, by knowledge of this voltage value UB, the permissible loading of source energy store 112, the (relevant) boost converter performance, as well as the further current loading of boost converter 205, for example, at the VUP terminal, the suitable programming of the target control current, that is, of charging current 120 of ER charger 124/124_1, takes place through unit 118 for charging by real-time calculation, or through real-time access to a corresponding cross-reference list (which may be constructed as a look-up table), with voltage value UB as an input variable and target control current 120 as an output variable.

The approach put forward here may be summarized once more, using different words. By rapidly measuring the voltage of source energy store 112, in this case, the battery voltage of vehicle 100, e.g., in a 0.5 ms to 10 ms grid, and the minimum input power consequently known in the case of a given boost converter 205, as a function of battery voltage 116 (UB), the minimum output power of boost converter 205 as a function of current battery voltage 116 or UB is also known. Thus, in the 0.5 ms to 10 ms grid, the programming and/or setting of charging-current controller 124/124_1 may be adjusted to the specific performance of boost converter 205. Through this, considerably more rapid charging times of power reserve ER or personal-protection-device energy store 104 may be attained, if, for example, in the case of a static voltage value UB=6 V with a defective battery as source energy store 112 is disregarded. In the same way, specifications for permissible loading of source energy store 112 as a function of supply voltage (UB) 116 may be taken into account.

The following scenario may be indicated as an example of the efficiency of the approach put forward here: A vehicle battery having an energy capacity of 80 Ah and a 740 A short-circuit current intensity (at an internal resistance of Ri=19 mOhm) and a minimum cell voltage of 1.7 V supplies a minimum battery voltage of 10.2 V. In a radio setting, such a vehicle battery supplies a maximum of 50 A to the vehicle electrical system. Thus,:

$$UB\ min = 6*1.7\ V - 50\ A*19\ mOhm = 9.25\ V.$$

If the length of the airbag supply line is 7 m with a performance cross section of 0.5 mm$^2$, then, in response to a supply current of approximately 2 A, a further voltage drop of 0.5 V is produced up to the supply terminals of the control unit, through which the following results:

UBmin_Airbag=8.75 V!

If, using microcontroller μC, a voltage value UB of, for example, UBmin_Airbag=8.75 V is measured at the input terminals of the airbag control unit with the aid of a rapid measurement of battery voltage 116, then:

$$I\text{charge\_default\_max} = \{[(UB\_\min\_wc-1\ V)* \\ I\text{boost\_min}* D\text{boost\_min}*\eta\text{boost\_min}]/VUP\}- \\ IV2\_\max=80\ mA\ at\ UB\_\min\_wc=6\ V$$

$$I\text{charge\_adapt} = \{[(UB\_Airbag-1 \\ V)*I\text{boost\_min}*D\text{boost\_min}*\eta\text{boost\_min}]/ \\ VUP\}-IV2\_\max=185\ mA\ at\ UB\_ \\ Airbag\_\min=8.75\ V$$

Consequently, the following values may be obtained, for example:

$$I\text{boost\_min}=2\ A;\ D\text{boost\_min}=0.9;\ \eta\text{boost\_min}=0.7;\\ VUP=33\ V;\ IV2\_\max=111\ mA$$

As the example above shows, by appropriately calculating charging current 120 or Icharge_adapt, microcontroller μC may determine or adjust the power-reserve charging current 120 or Icharge_default_max primarily programmed for the worst case, in rapid succession (for example, in a grid of 0.5 ms to 10 ms time windows) for ascertainment, by inputting (that is, programming or changing or adjusting) new Icharge_adapt values for charging current 120 via charging-current controller 124/124_1 or unit 118, and may therefore shorten the charging time of power reserve ER, that is, of personal-protection-device energy store 104, markedly.

For example, in the case of a storage capacitance of power reserve ER, that is, of personal-protection-device energy store 104, of CERmax=10 mF and a charging voltage=VUP=33 V, a charging current 120 or Icharge_adapt of 185 mA at a voltage value UB or UB_Airbag_min of 8.75 V may be attained. This results in a charging time of $$T\text{charge\_adapt}=10\ mF*33\ V/185\ mA=1.78\ s!!$$

This is already a value, which only occurs under unfavorable conditions (that is, highly discharged battery and high current drain by load circuits during stoppage (e.g., in the radio setting)). Well-charged or less-loaded batteries or source energy store 112 produce even higher minimum voltage values UB or UB_Airbag_min and may be used by microcontroller μC or unit 118 for ascertaining, in accordance with the above-mentioned equation, to select or ascertain even higher charging currents 120 or Icharge_adapt values.

The calculation of the Icharge_adapt values or charging currents 120 for charging-current controller 124/124_1 by unit 118 in the form of a component of the SBC or a component of the μC (SW function), in a rapid 0.5 ms to 10 ms grid, may be omitted or supplemented by the use of scalable (depending on the boost converter hardware and/or permissible source energy store loading), stored tables, which, in the form of a look-up table to microcontroller μC, assign, in each instance, a corresponding charging current 120 or Icharge_adapt value to be selected, to the measured UB_Airbag voltage or to the measured voltage value UB. Thus, the numerical loading of microcontroller μC may be reduced, and/or the table may be adapted even more effectively and/or ascertained in accordance with the detail capabilities of boost converter circuit 205 (ηboost is a complex variable), the charging-current controller 124/124_1, its current increments to be set, of the charging currents 120 to be programmed, etc. The rate of the charging-current adjustment may also be ascertained and/or set in accordance with the dynamic current-carrying capacity of the components in the supply path (filter algorithm).

Figure 3:
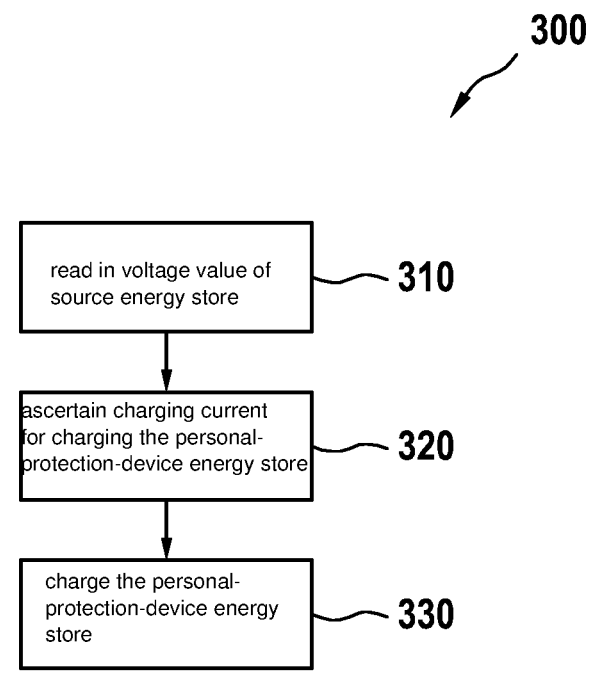
FIG. 3 shows a flow chart of a method according to one exemplary embodiment of the present invention.

FIG. 3 shows a flow chart of an exemplary embodiment of the present invention, in the form of a method 300 to charge a personal-protection-device energy store for operating a personal protection device of a vehicle. Method 300 includes a step 310 of reading in a voltage value of a source energy store of the vehicle. In addition, method 300 includes a step 320 of ascertaining a charging current for charging the personal-protection-device energy store with power from the source energy store; the charging current being ascertained, using the voltage value read in, and/or using the performance of the boost converter (minimum input power at a minimum voltage UB; efficiency, the permissible loading of the source store, current as a function of the voltage), and using the charging current to charge the personal-protection-device energy store. Finally, method 300 includes a step 330 of charging the personal-protection-device energy store, using the ascertained charging current.

If an exemplary embodiment includes an "and/or" conjunction between a first feature and a second feature, then this is to be read such that, according to one specific embodiment, the exemplary embodiment includes both the first feature and the second feature, and according to another specific embodiment, the exemplary embodiment includes either only the first feature or only the second feature.

What is claimed is:

1. A method to charge a personal-protection-device energy store for operating a personal protection device of a vehicle, the method comprising:
reading in a voltage value of a source energy store of the vehicle and reading in an instantaneous charging current of the personal-protection-device energy store measured across a shunt resistor; and
ascertaining, via a control unit, (i) a charging current for charging the personal-protection-device energy store with power from the source energy store, the ascertaining of the charging current taking place using the voltage value read in, and/or (ii) a supply current of a control unit or a change of the supply current by selecting the charging current of the personal-protection-device energy store; and
using the charging current to charge the personal-protection-device energy store;
wherein the control unit includes a boost converter, using a current battery voltage, is configured to generate a reverse-polarity-protected battery voltage filtered by a filter unit,
wherein the boost converter includes a boost transistor, which is a current-limited switching transistor for providing a limited current, wherein the limited current is produced across a comparator,
wherein a current through the boost transistor and the shunt resistor increases to a limited current, and the comparator switches off the boost transistor via a Pulse Width Modulation (PWM) logic circuit,
wherein clocked operation of the boost converter is provided by the PWM logic circuit, which receives a switching converter frequency, and
wherein a duty cycle of the switching converter frequency is adjusted by the PWM logic circuit as a function of a measured, instantaneous converter current, as measured across the shunt resistor, with an operational amplifier in the PWM logic circuit, and/or by a current voltage.

2. The method as recited in claim 1, further comprising: switching off a charging-current controller or adjusting a compensation charging current, if a charging current read back is less than a predefined charging current and signals an end state of the charging of the personal-protection-device energy store at a voltage at the personal-protection-device energy store, which is within a tolerance range of a supply voltage of the control unit.

3. The method as recited in claim 1, wherein the reading-in and the ascertaining are executed during a charging operation of the personal-protection-device energy store and are repeated cyclically.

4. The method as recited in claim 1, wherein the reading-in and the ascertaining are executed and repeated after a time interval of 0.5 ms to 10 ms.

5. The method as recited in claim 3, wherein cyclical charging-current selections in defined time steps are predefined by a filtering algorithm so as to be increasing with defined, small current steps and/or to be decreasing with defined, large current steps, to prevent overloading of the boost converter circuit and/or of the source energy store.

6. The method as recited in claim 1, wherein in the ascertaining, the charging current is ascertained using a look-up table.

7. The method as recited in claim 1, wherein in the ascertaining, the charging current is ascertaining using a look-up table which: (i) models a performance of the boost converter under load of connected load circuits, as a function of the voltage, and/or (ii) is a function of a permissible instantaneous loading of the source energy store, and/or (iii) is adaptable to different boost converters and/or source stores in a scalable manner.

8. The method as recited in claim 1, wherein in the ascertaining, the charging current is ascertained using knowledge of an instantaneous power demand of at least one electronic component of the vehicle.

9. The method as recited in claim 1, wherein in the reading-in, the voltage value is read in by a voltage divider, a value read in by the voltage divider being converted from analog to digital.

10. The method as recited in claim 1, wherein in the reading-in, the voltage value is read in by a voltage divider, which is connected in series with a switch that is connected on a high side or on a low side, and/or which blocks and/or is switched at high resistance in a rest state of a control unit of the personal protection device.

11. The method as recited in claim 1, further comprising:
charging the personal-protection-device energy store using the ascertained charging current, wherein, in the charging, a current-controlled transistor is used for supplying the charging current.

12. The method as recited in claim 1, wherein the reading in and the ascertaining are executed and/or controlled, using a digital processing unit.

13. A control apparatus, comprising:
a control unit to charge a personal-protection-device energy store for operating a personal protection device of a vehicle, by performing the following:
reading in a voltage value of a source energy store of the vehicle and reading in an instantaneous charging current of the personal-protection-device energy store measured across a shunt resistor;
ascertaining (i) a charging current for charging the personal-protection-device energy store with power from the source energy store, the ascertaining of the charging current taking place using the voltage value read in, and/or (ii) a supply current of a control unit or a change of the supply current by selecting the charging current of the personal-protection-device energy store; and using the charging current to charge the personal-protection-device energy store;

wherein the control unit includes a boost converter, using a current battery voltage, is configured to generate a reverse-polarity-protected battery voltage filtered by a filter unit, wherein the boost converter includes a boost transistor, which is a current-limited switching transistor for providing a limited current, wherein the limited current is produced across a comparator, wherein a current through the boost transistor and the shunt resistor increases to a limited current, and the comparator switches off the boost transistor via a Pulse Width Modulation PWM logic circuit, wherein clocked operation of the boost converter is provided by the PWM logic circuit, which receives a switching converter frequency, and wherein a duty cycle of the switching converter frequency is adjusted by the PWM logic circuit as a function of a measured, instantaneous converter current, as measured across the shunt resistor, with an operational amplifier in the PWM logic circuit, and/or by a current voltage.

14. A non-transitory machine-readable storage medium on which is stored a computer program, which is executable by a processor of a control unit, comprising:

a program code arrangement having program code to charge a personal-protection-device energy store for operating a personal protection device of a vehicle, the computer program, by performing the following:

reading in a voltage value of a source energy store of the vehicle and reading in an instantaneous charging current of the personal-protection-device energy store measured across a shunt resistor;

ascertaining (i) a charging current for charging the personal-protection-device energy store with power from the source energy store, the ascertaining of the charging current taking place using the voltage value read in, and/or (ii) a supply current of a control unit or a change of the supply current by selecting the charging current of the personal-protection-device energy store; and using the charging current to charge the personal-protection-device energy store;

wherein the control unit includes a boost converter, using a current battery voltage, is configured to generate a reverse-polarity-protected battery voltage filtered by a filter unit, wherein the boost converter includes a boost transistor, which is a current-limited switching transistor for providing a limited current, wherein the limited current is produced across a comparator, wherein a current through the boost transistor and the shunt resistor increases to a limited current, and the comparator switches off the boost transistor via a Pulse Width Modulation PWM logic circuit, wherein clocked operation of the boost converter is provided by the PWM logic circuit, which receives a switching converter frequency, and wherein a duty cycle of the switching converter frequency is adjusted by the PWM logic circuit as a function of a measured, instantaneous converter current, as measured across the shunt resistor, with an operational amplifier in the PWM logic circuit, and/or by a current voltage.

\* \* \* \* \*